United States Patent
Ma et al.

(10) Patent No.: US 11,453,930 B2
(45) Date of Patent: Sep. 27, 2022

(54) METHOD FOR ENHANCING LEACHING OF METALS IN ZINC HYPOXIDE POWDER BY MECHANOCHEMISTRY COUPLING WITH SONOCHEMISTRY

(71) Applicant: GreenNovo Environmental Technology Co., Ltd, Honghe (CN)

(72) Inventors: Liyang Ma, Honghe (CN); Jinhui Li, Honghe (CN); Wu Zhang, Honghe (CN); Kang Liu, Honghe (CN); Yunxue Zhang, Honghe (CN); Chunlin Li, Honghe (CN); Rubin Bai, Honghe (CN); Guisheng Huang, Honghe (CN)

(73) Assignee: GreenNovo Environmental Technology Co., Ltd, Honghe (CN)

( * ) Notice: Subject to any disclaimer, the term of this patent is extended or adjusted under 35 U.S.C. 154(b) by 331 days.

(21) Appl. No.: 16/796,745

(22) Filed: Feb. 20, 2020

(65) Prior Publication Data

US 2020/0385841 A1  Dec. 10, 2020

(30) Foreign Application Priority Data

Jun. 6, 2019  (CN) .......................... 201910491362.8

(51) Int. Cl.
*C22B 3/08* (2006.01)
(52) U.S. Cl.
CPC ..................................... *C22B 3/08* (2013.01)
(58) Field of Classification Search
None
See application file for complete search history.

(56) References Cited

U.S. PATENT DOCUMENTS

2020/0385841 A1* 12/2020 Ma .......................... C22B 7/005

FOREIGN PATENT DOCUMENTS

CN  102952949  3/2013

OTHER PUBLICATIONS

English Language translation of CN 102952949 A (Year: 2013).*
Office Action dated May 18, 2020 in CN Patent Application No. 201910491362.8, pp. 1-11.

* cited by examiner

*Primary Examiner* — Scott R Kastler
(74) *Attorney, Agent, or Firm* — Byrne Poh LLP; Nina R. Horan

(57) ABSTRACT

Disclosed is a method for enhancing leaching of metals in zinc hypoxide powder by mechanochemistry coupling with sonochemistry, comprising the following: mechanical activation: a raw material containing zinc hypoxide powder is mechanically activated so that an activated material is obtained; and ultrasonic treatment: the activated material is mixed with an acidic leaching solution to obtain a mixture, the mixture is subjected to ultrasonic treatment, and a liquid phase is obtained as the leachate. Mechanochemical activation and ultrasonic chemistry synergistically enhance the leaching efficiency and leaching rate of multiple metals through the destruction and cavitation of the zinc oxide powder structure. This process can indirectly reduce the concentration of the used acidic leaching solution and shorten the leaching duration. In practical production, the specific application of the process can reduce the anticorrosion cost and running cost of reaction equipment, indirectly leading to excellent production benefit.

5 Claims, 1 Drawing Sheet

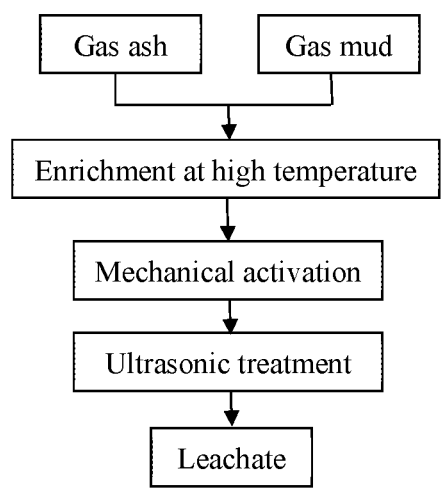

METHOD FOR ENHANCING LEACHING OF METALS IN ZINC HYPOXIDE POWDER BY MECHANOCHEMISTRY COUPLING WITH SONOCHEMISTRY

CROSS-REFERENCE TO RELATED APPLICATIONS

This application claims the benefit of Chinese Patent Application No. 201910491362.8, filed on Jun. 6, 2019 to the China National Intellectual Property Administration, the contents of which are hereby incorporated by reference herein in its entirety.

TECHNICAL FIELD

The present invention relates to the technical field of industrial solid waste treatment and recycling, in particular to a method for enhancing leaching of metals in zinc hypoxide powder by mechanochemistry coupling with sonochemistry.

BACKGROUND

During iron and steel smelting in blast furnace, metal impurities contained in iron ore, like zinc and lead, are reduced by reducing agents such as coke under high temperature to form saturated steam of metallic simple substances, while fine dust including iron ore, coke and high temperature fusing assistant is entrained outside the furnace by blast furnace gas, and turns into main solid waste in the iron and steel industry, known as blast furnace ironmaking smoke (gas ash or gas mud). The steel output of iron and steel smelting plants in China is increasingly growing, which promotes the development of the economy of China, however, on the other hand, the industrial solid wastes generated by iron and steel smelting become potential environmental hazard. From the viewpoint of cyclic economy, the gas ash should be regarded as a precious secondary metal resource in order to realize comprehensive utilization and recycling utilization of these metal resource.

In practical production, the metals contained in the gas mud are in low amounts and usually difficult to recycle in most cases. The blast furnace gas ash contains complex chemical components, wherein the metal elements with high content comprise metals such as lead, iron, aluminum, zinc and copper, and alkali metal oxides. In general, in order to better recover the low-grade metals in the gas mud, the metals and metal compounds therein need to be enriched in a rotary kiln at high temperature. The current technical means commonly used in industry comprises mixing the low-grade and high-impurity gas ash with the reducing agent, i.e. coke, for high-temperature thermal reduction reaction in a rotary kiln, and conducting enrichment treatment by pyrometallurgy to obtain an enrichment substance which is rich in volatile metal elements, mainly zinc hypoxide powder. As the primary product zinc hypoxide powder is typically rich in dozens of metal elements, the separation and extraction recovery of the metal elements have always been puzzles in the industry.

In order to realize effective separation of valuable metal elements in the zinc hypoxide, in the hydrometallurgical process, an acid leaching process is firstly required for transfer of various metal elements and compounds in the zinc hypoxide powder to a liquid phase. In the wet leaching process, different properties of metal compounds in the zinc hypoxide powder leads to incomplete hydrometallurgical leaching of multiple metal elements and metal compounds as well as unsatisfactory leaching efficiencies, affecting the actual production benefit and efficiency and increasing the production cost of enterprises.

In the actual industrial production, the leaching ratios of metals in zinc hypoxide powder can be increased and the leaching duration can be shortened by adopting a method of increasing the acid concentration of the leaching solution and of increasing the stirring speed during leaching. However, increased acid concentration of the leaching solution will increase the anticorrosion cost of the reaction equipment on the one hand, and will impair the operating life of the equipment, which indirectly increase the production cost. Likewise, increased stirring speed often tends to cause the problem of uneven mixing of the slurry during leaching while increases energy consumption of production. In order to better improve the leaching ratios of metals in zinc hypoxide powder as well as increase the leaching rate of the metals, there is an urgent need at present to develop a novel process with high feasibility, low running cost and high operational safety.

SUMMARY

The present invention provides a method for enhancing leaching of metals in zinc hypoxide powder by mechanochemistry coupling with sonochemistry, which solves the problems that the operation life of equipment is reduced and the production cost is indirectly increased when the leaching ratios of the metals in zinc hypoxide powder are increased and the leaching duration is shortened by increasing the acid concentration of a leaching solution; and that uneven mixing of the slurry during leaching and increased energy consumption of production are caused when the leaching ratios of the metals in zinc hypoxide powder are increased and the leaching duration is shortened by increasing stirring speed.

In order to solve the aforementioned technical problems, an embodiment adopts the following technical scheme:

a method for enhancing leaching of metals in zinc hypoxide powder by mechanochemistry coupling with sonochemistry, comprising the following steps:

mechanical activation: a raw material containing zinc hypoxide powder is mechanically activated so that an activated material is obtained; and ultrasonic treatment: the activated material is mixed with an acidic leaching solution to obtain a mixture, the mixture is subjected to ultrasonic treatment, and a liquid phase is obtained as the leachate.

Preferably, the raw material is derived from enrichment of volatile products of the high-temperature reaction of gas ash and coke in a rotary kiln.

Preferably, the mechanical activation comprises feeding the raw materials into a ball mill for grinding, wherein the mill pot and the grinding balls of the ball mill are both made of zirconia.

Preferably, the mechanical activation is carried out in a planetary ball mill, the rotating speed of the ball mill in the step of mechanical activation is 400-700 rpm, the ball milling duration is 1-4 h, the reaction temperature is >18° C., and the ball-to-material ratio is 40-80:1.

Preferably, the acidic leaching solution has a pH of 4.5-5.5.

Preferably, the acidic leaching solution is a sulfuric acid solution.

Preferably, the ultrasonic treatment duration is 1-5.0 min, the reaction temperature is 18-25° C., and the power of the ultrasonic device used is 25-45 kHz.

As compared to the existing technologies, the present invention has at least one of the following beneficial effects:

the leaching ratio of the polymetallic compound in the zinc hypoxide powder in the acidic leaching solution can be improved and the leaching rate of the polymetallic compound can be improved by utilizing the destructive effect of mechanochemical activation on the physical chemical structure of the zinc hypoxide powder. As the mechanochemical activation reaction is generally carried out at room temperature, the reaction energy consumption of the planetary ball mill is very low, thus the method has remarkable technical benefit in practical industrial production. The zirconia mill pot is closed during mechanochemical activation reaction, so that the volatilization of materials and dust is avoided during mechanochemical reaction, accordingly, the proposed mechanochemical activation process possesses outstanding environmental and technical benefits. Due to the fact that microbubbles with the pressure of thousands of atmospheres can be instantly generated through ultrasonic cavitation in the ultrasonic chemistry, a series of physical and chemical effects are triggered, the leaching ratios of main elements zinc and iron in the zinc hypoxide powder is up to 99.0 wt % once the mechanical force chemical reaction is incorporated, and the leaching duration is only 1-5.0 min.

The coupled process is suitable for the zinc hypoxide powder with various components, and the leaching ratios and leaching rate of multiple metals in the zinc hypoxide powder having different sources, different proportions and different compositions can be enhanced through the action of coupled mechanochemical activation and ultrasonic chemistry.

The ball milling equipment used in an embodiment is a planetary ball mill, and the mill pot used is a zirconia mill pot. The higher ball milling rotating speed of the ball mill during the mechanochemical activation is, the more ideal activation effect of the zinc hypoxide powder is, and the better leaching ratios and leaching rate of the multiple metals are.

The ultrasonic instrument used in an embodiment is an ultrasonic cleaner, and the leaching efficiencies of various metals in the zinc hypoxide powder can be further enhanced via the cavitation effect of the ultrasonic, wherein, the higher the frequency of the ultrasonic instrument is, the more obvious the enhancing effect of leaching is.

Mechanochemical activation and ultrasonic chemistry synergistically enhance the leaching ratios and leaching rate of a multiple metals through the destruction and cavitation of the zinc oxide powder structure. This process can indirectly reduce the concentration at which the acidic leaching solution is used and shorten the leaching duration. In practical production, the specific application of the process can reduce the anticorrosion cost and running cost of reaction equipment, leading to excellent production benefit indirectly.

BRIEF DESCRIPTION OF THE DRAWINGS

FIG. 1 is a flow diagram of an embodiment.

DETAILED DESCRIPTION

In order to make the technical solutions and advantages of the present invention more apparent, the present invention is described in further detail below with reference to the accompanying drawings and examples. It should be understood that the specific examples described herein are merely illustrative of some embodiments and are not intended to limit the present invention.

A method for enhancing leaching of metals in zinc hypoxide powder by mechanochemistry coupling with sonochemistry, comprising the following steps:

mechanical activation: volatile products of the high-temperature reaction of gas ash and coke in a rotary kiln are enriched to obtain a raw material containing zinc hypoxide powder, the raw material is fed into a planetary ball mill for grinding, wherein the rotating speed of the ball mill is 400-700 rpm, the ball milling duration is 1-4 h, the reaction temperature is >18° C., and the ball-to-material ratio is 0.5-5:1, thereby a activated material is obtained, wherein the mill pot and the grinding balls of the ball mill were both made of zirconia;

ultrasonic treatment: the activated material is mixed with an acidic leaching solution with the pH value of 4.5-5.5 to obtain a mixture, the mixture is subjected to ultrasonic treatment, wherein the ultrasonic treatment duration is 1-5.0 min, the reaction temperature is 18-25° C., and the power of the ultrasonic device used is 25-45 kHz, thereby a liquid phase is obtained as the leachate.

An embodiment discloses a method for enhancing leaching of metals in zinc hypoxide powder by mechanochemistry coupling with sonochemistry, characterized by comprising the following steps:

zinc hypoxide powder, as the raw material for reaction, is firstly subjected to mechanochemical activation reaction within a mill pot of a ball mill in order to destroy the physical-chemical structure of the zinc hypoxide powder;

The zinc hypoxide powder after the mechanochemical activation reaction is extracted from the mill pot, and leached in an acidic leaching solution. During leaching, the acidic leaching solution is placed in ultrasonic instruments with various powers in order to investigate the improvement of leaching of metals in zinc hypoxide powder by coupled mechanochemical activation reaction and sonochemistry.

According to an embodiment, leaching of metals in zinc hypoxide powder is enhanced by using a method with mechanochemistry coupling with sonochemistry. By improving the process procedure and parameters and conditions of each step, the practical problems in the prior art can be effectively solved, such as relatively low leaching ratios of metal elements such as zinc, iron, copper, cobalt and nickel in the zinc hypoxide powder, high acid concentration in the leaching solution used and long leaching duration during production.

Example 1

1.0 g of zinc hypoxide powder, as the raw material for reaction, was firstly subjected to mechanochemical activation reaction within a mill pot of a ball mill, with the ball milling rotation speed being 400 rpm, the ball milling duration being 1.0 h, and the ball-material ratio being 40:1. The zinc hypoxide powder after the mechanochemical activation reaction was extracted from the mill pot, and leached in an acidic leaching solution which was set to have pH value of 4.5. During leaching, the reaction power of the ultrasonic instrument was 25 kHz, the leaching duration was 5.0 min, and the reaction temperature was 25° C., i.e. room temperature. The contents of elements in the resultant leachate were determined by adopting whole-spectrum direct-reading plasma emission spectrum, which revealed that the leaching ratio of zinc, ferrum, cobalt and nickel could reach above 95.4%, 92.7%, 93.1% and 91.3% respectively.

Example 2

1.0 g of zinc hypoxide powder, as the raw material for reaction, was firstly subjected to mechanochemical activation reaction within a mill pot of a ball mill, with the ball milling rotation speed being 500 rpm, the ball milling duration being 2.0 h, and the ball-material ratio being 50:1. The zinc hypoxide powder after the mechanochemical activation reaction was extracted from the mill pot, and leached in an acidic leaching solution which was set to have pH value of 5.0. During leaching, the acidic leaching solution was placed in ultrasonic instruments with various powers in order to investigate the improvement of leaching of metals in zinc hypoxide powder by coupled mechanochemical activation reaction and sonochemistry. The reaction power of the ultrasonic instrument was 35 kHz, the leaching duration was 3.0 min, and the reaction temperature was 25° C., i.e. room temperature. The contents of elements in the resultant leachate were determined by adopting whole-spectrum direct-reading plasma emission spectrum, which revealed that the leaching ratio of zinc, ferrum, cobalt and nickel could reach above 97.6%, 93.1%, 95.2% and 92.6% respectively.

Example 3

1.0 g of zinc hypoxide powder, as the raw material for reaction, was firstly subjected to mechanochemical activation reaction within a mill pot of a ball mill, with the ball milling rotation speed being 600 rpm, the ball milling duration being 3.0 h, and the ball-material ratio being 60:1. The zinc hypoxide powder after the mechanochemical activation reaction was extracted from the mill pot, and leached in an acidic leaching solution which was set to have pH value of 5.5. During leaching, the acidic leaching solution was placed in ultrasonic instruments with various powers in order to investigate the improvement of leaching of metals in zinc hypoxide powder by coupled mechanochemical activation reaction and sonochemistry. The reaction power of the ultrasonic instrument was 40 kHz, the leaching duration was 1.0 min, and the reaction temperature was 18° C., i.e. room temperature. The contents of elements in the resultant leachate were determined by adopting whole-spectrum direct-reading plasma emission spectrum, which revealed that the leaching ratio of zinc, ferrum, cobalt and nickel could reach above 98.2%, 94.2%, 96.1% and 93.6% respectively.

Example 4

1.0 g of zinc hypoxide powder, as the raw material for reaction, was firstly subjected to mechanochemical activation reaction within a mill pot of a ball mill, with the ball milling rotation speed being 700 rpm, the ball milling duration being 4.0 h, and the ball-material ratio being 80:1. The zinc hypoxide powder after the mechanochemical activation reaction was extracted from the mill pot, and leached in an acidic leaching solution wherein the pH value of the acidic leaching solution was set to be 5.0. During leaching, the acidic leaching solution was placed in ultrasonic instruments with various powers in order to investigate the improvement of leaching of metals in zinc hypoxide powder by coupled mechanochemical activation reaction and sono-chemistry. The reaction power of the ultrasonic instrument was 45 kHz, the leaching duration was 4.0 min, and the reaction temperature was 25° C., i.e. room temperature. The contents of elements in the resultant leachate were determined by adopting whole-spectrum direct-reading plasma emission spectrum, which revealed that the leaching ratio of zinc, ferrum, cobalt and nickel could reach above 99.3%, 95.3%, 97.2% and 94.1% respectively.

Taking example 4 as an example, the effects of mechanical activation and ultrasound on leaching ratios were investigated with establishing controls.

Control 1: the same as Example 4 except that ultrasonic treatment was not performed on raw materials.

Control 2: the same as Example 4 except that mechanical activation was not performed on raw materials.

Control 3: the same as Example 4 except that neither ultrasonic treatment nor mechanical activation was performed on raw materials.

The leaching ratio of each metal in the aforementioned controls and Example 4 is displayed in the following table:

| Serial No. | Zinc leaching ratio % | Ferrum leaching ratio % | Cobalt leaching ratio % | Nickel leaching ratio % |
|---|---|---|---|---|
| Example 4 | 99.3 | 95.3 | 97.2 | 94.1 |
| Control 1 | 87.1 | 79.6 | 77.6 | 83.4 |
| Control 2 | 56.2 | 65.3 | 49.7 | 55.1 |
| Control 3 | 24.6 | 21.3 | 37.6 | 23.4 |

As can be seen from the table above, although the leaching ratios of the metals in the raw material can be improved by performing either ultrasonic or mechanical activation on the raw material containing zinc hypoxide powder, the leaching ratios of the metals were improved remarkably due to synergetic effect of ultrasonic treatment and mechanical activation as they can supplement each other, cooperate with each other and promote each other.

Although the present invention has been described herein with reference to a number of illustrative embodiments thereof, it should be understood that numerous other modifications and embodiments can be devised by those skilled in the art that will fall within the spirit and scope of the principles of this disclosure. More specifically, various variations and modifications are possible in the component parts and/or arrangements of the combination arrangement of the subject matter within the scope of the disclosure, the drawings and the appended claims. In addition to variations and modifications in the component parts and/or arrangements, other uses will also be apparent to those skilled in the art.

What is claimed is:

1. A method for enhancing leaching of metals in zinc hypoxide powder by mechanochemistry coupling with sono-chemistry, comprising:
   mechanically activating a raw material containing zinc hypoxide powder to obtain an activated material; and
   ultrasonically treating the activated material by mixing it with an acidic leaching solution to obtain a mixture, the mixture being subjected to ultrasonic treatment, and obtaining a liquid phase as the leachate;
   wherein mechanical activation comprises feeding the raw material into a ball mill for grinding, wherein the ball mill comprises a mill pot and grinding balls, the mill pot and grinding balls being made of zirconia; and
   wherein the ball mill is a planetary ball mill, the rotating speed of the ball mill in the mechanical activation step is 400-700 rpm, the ball milling duration is 1-4 h, the reaction temperature is greater than 18° C., and the ball-to-material ratio is 40-80:1.

2. The method for enhancing leaching of metals in zinc hypoxide powder by mechanochemistry coupling with sonochemistry according to claim 1, wherein the raw material is obtained by enrichment of volatile products of a high-temperature reaction of gas ash and coke in a rotary kiln.

3. The method for enhancing leaching of metals in zinc hypoxide powder by mechanochemistry coupling with sonochemistry according to claim 1, wherein the acidic leaching solution has a pH of 4.5-5.5.

4. The method for enhancing leaching of metals in zinc hypoxide powder by mechanochemistry coupling with sonochemistry according to claim 1, wherein the acidic leaching solution is a sulfuric acid solution.

5. The method for enhancing leaching of metals in zinc hypoxide powder by mechanochemistry coupling with sonochemistry according to claim 1, wherein the ultrasonic treatment duration is 1-5.0 min, the reaction temperature is 18-25° C., and the power of the ultrasonic device used is 25-45 kHz.

* * * * *